(12) United States Patent
Piorkowski

(10) Patent No.: US 11,773,261 B2
(45) Date of Patent: *Oct. 3, 2023

(54) USE OF POLOXAMERS AND ALKYL ALCOHOL BLENDS TO CONTROL SURFACTANT COMPOSITION RHEOLOGY

(71) Applicant: Henkel AG & Co. KGaA, Duesseldorf (DE)

(72) Inventor: Daniel T. Piorkowski, Fairfield, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 826 days.

This patent is subject to a terminal disclaimer.

(21) Appl. No.: 16/546,557

(22) Filed: Aug. 21, 2019

(65) Prior Publication Data

US 2021/0054196 A1 Feb. 25, 2021

(51) Int. Cl.
*C08L 71/08* (2006.01)
*C08K 5/41* (2006.01)

(52) U.S. Cl.
CPC ............. *C08L 71/08* (2013.01); *C08K 5/41* (2013.01); *C08L 2205/025* (2013.01)

(58) Field of Classification Search
CPC ..... C08L 71/08; C08L 2205/025; C08K 5/41; C11D 3/2006; C11D 1/29; C11D 3/3707
See application file for complete search history.

(56) References Cited

U.S. PATENT DOCUMENTS

| 3,812,041 | A | 5/1974 | Inamorato |
| 4,744,916 | A | 5/1988 | Adams |
| 6,048,831 | A | 4/2000 | Mori et al. |
| 6,482,792 | B2 | 11/2002 | Ip |

(Continued)

FOREIGN PATENT DOCUMENTS

| CA | 1293905 C | 1/1992 |
| GB | 2209342 A | 5/1989 |

(Continued)

OTHER PUBLICATIONS

International Search Report Application No. PCT/US2020/047283 Completed: Nov. 25, 2020 dated Nov. 26, 2020 10 Pages.

(Continued)

*Primary Examiner* — Vishal V Vasisth
(74) *Attorney, Agent, or Firm* — Bojuan Deng

(57) ABSTRACT

A surfactant composition includes a surfactant component including an alcohol ethoxy sulfate having a $C_8$-$C_{20}$ backbone ethoxylated with from about 1 to about 10 moles of ethylene oxide and is present in an amount of from about 20 to about 80 weight percent actives. The surfactant composition also includes water present in a total amount of about 10 to about 35 weight percent. The surfactant composition further includes an alkyl alcohol present in an amount of from about 3 to about 10 weight percent. The surfactant composition also includes a liquid block copolymer present in an amount of about 5 to about 30 weight percent actives. The liquid block copolymer has formula (I) or (II) and a weight average molecular weight of less than about 5,000 g/mol. The surfactant composition has a viscosity of less than about 5,000 cps measured at 20° C.

19 Claims, 1 Drawing Sheet

(56) References Cited

U.S. PATENT DOCUMENTS

| | | |
|---|---|---|
| 6,566,317 B2 | 5/2003 | Morris et al. |
| 2004/0077519 A1 | 4/2004 | Price et al. |
| 2006/0094617 A1 | 5/2006 | Price et al. |
| 2018/0100124 A1* | 4/2018 | Piorkowski ......... C11D 11/0017 |
| 2018/0216037 A1 | 8/2018 | Hamersky et al. |
| 2018/0312788 A1 | 11/2018 | Naqvi et al. |

FOREIGN PATENT DOCUMENTS

| | | |
|---|---|---|
| KR | 1020120038992 A | 4/2012 |
| KR | 101675787 B1 | 11/2016 |

OTHER PUBLICATIONS

Piorkowski, Daniel T., U.S. Appl. No. 16/231,309, "Use of Ethyleneoxy and Propyleneoxy Copolymer to Control Rheology of Unit Dose Detergent Pack", filed Dec. 21, 2018.

Piorkowski, Daniel T. et al., U.S. Appl. No. 16/231,232, "Use of Ionic Liquids to Control Rheology of Unit Dose Detergent Compositions," filed Dec. 21, 2018.

Piorkowski, Daniel T. et al., U.S. Appl. No. 16/231,269 entitled, "Use of Polyglycols to Control Rheology of Unit Dose Detergent Compositions," filed Dec. 21, 2018.

Piorkowski, Daniel T. et al., U.S. Appl. No. 16/231,298, "Use of Alkoxylated Polyamines to Control Rheology of Unit Dose Detergent Compositions," filed Dec. 21, 2018.

* cited by examiner

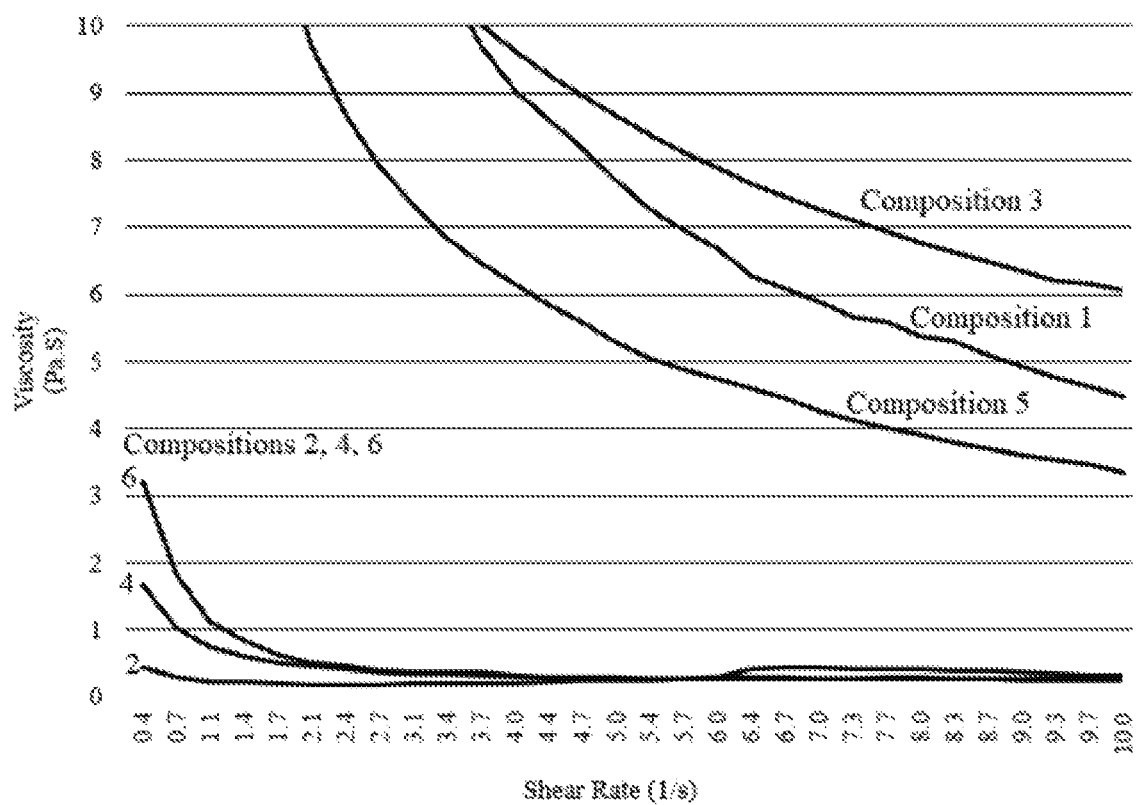

USE OF POLOXAMERS AND ALKYL ALCOHOL BLENDS TO CONTROL SURFACTANT COMPOSITION RHEOLOGY

FIELD OF THE INVENTION

The present disclosure generally relates to a surfactant composition and a method of controlling the rheology of the composition. More specifically, the disclosure relates to inclusion of an ethyleneoxy (EO) and propyleneoxy (PO) poloxamer in a surfactant composition including an alkyl alcohol and an alcohol ethoxy sulfate surfactant.

BACKGROUND OF THE INVENTION

Many current detergent compositions include surfactants, such as sodium laureth sulfate. However, these types of surfactants typically increase in viscosity upon dilution with water. For example, detergent compositions that that include sodium laureth sulfate are known to be potentially difficult to work with because of the tendency to increase in viscosity and form near solid masses that can be difficult to dissolve. For example, such detergent compositions can have viscosities upon dilution with water that approach and exceed 100 Pa·s when measured at a shear rate of 0.41 l/sec using commonly available rheometers. One commercially available product exhibits non-Newtonian characteristics and is difficult to handle due to its high viscosity of about 33 Pa·s when measured at a shear rate of 1.08 l/sec using commonly available rheometers.

If these surfactants increase in viscosity in unit dose packs, the compositions are not suitable for cleaning various surfaces and stains because the surfactants do not homogeneously disperse in water. Moreover, even if the surfactants undergo an increased viscosity phase and then break apart, their cleaning effectiveness is still reduced. Accordingly, there remains an opportunity for improvement. Furthermore, other desirable features and characteristics of the present disclosure will become apparent from the subsequent detailed description of the disclosure and the appended claims, taken in conjunction this background of the disclosure.

SUMMARY OF THE INVENTION

This disclosure provides a surfactant composition that includes a surfactant component including an alcohol ethoxy sulfate having a $C_8$-$C_{20}$ backbone that is ethoxylated with from about 1 to about 10 moles of ethylene oxide and is present in an amount of from about 20 to about 80 weight percent actives based on a total weight of said surfactant composition. The surfactant composition also includes water present in a total amount of about 10 to about 50 weight percent based on a total weight of the surfactant composition. The surfactant composition further includes an alkyl alcohol present in an amount of from about 3 to about 10 weight percent based on a total weight of the surfactant composition. The surfactant composition also includes a liquid block copolymer present in an amount of about 5 to about 30 weight percent actives based on a total weight of the surfactant composition. The liquid block copolymer has the following formulae: $R^1O$-$(EO)_a$—$(PO)_b$-$(EO)_c$—$R^2$ (I); and/or $R^1O$—$(PO)_a$-$(EO)_b$—$(PO)_c$—$R^2$ (II). In these formulae, EO is a —$CH_2CH_2O$— group and PO is a —$CH(CH_3)CH_2O$— group. Moreover, each of $R^1$ and $R^2$ is independently H or a $C_1$-$C_{22}$ alkyl group and each of a, b, and c is independently about 1 to about 70 provided that a weight average molecular weight of said liquid block copolymer is less than about 5,000 g/mol. The surfactant composition has a viscosity of less than about 5,000 cps measured at 20° C.

This disclosure also provides a surfactant composition exhibiting approximate Newtonian behavior under shear. In this embodiment, the surfactant composition includes the surfactant component, the water, and the liquid block copolymer described above. Moreover, in this embodiment, the surfactant composition includes ethanol as the alkyl alcohol. In this embodiment, the surfactant composition has a viscosity of less than about 1,500 cps measured at 20° C.

This disclosure further provides a method for modifying rheology of a surfactant composition. The method includes the steps of providing the surfactant component, providing the alkyl alcohol, and providing the liquid block copolymer. The method also includes the step of combining the surfactant component, the alkyl alcohol, and the liquid block copolymer to form the surfactant composition. Upon formation, the surfactant component is present in an amount of from about 20 to about 80 weight percent actives based on a total weight of the surfactant composition, the alkyl alcohol is present in an amount of from about 3 to about 10 weight percent based on a total weight of the surfactant composition, and the liquid block copolymer is present in an amount of about 5 to about 30 weight percent actives based on a total weight of the surfactant composition. Moreover, upon combination, the surfactant composition includes water present in a total amount of about 10 to about 50 weight percent based on a total weight of the surfactant composition. In the method, the surfactant composition has a viscosity of less than about 5,000 cps measured at 20° C.

The surfactant composition exhibits superior and unexpected results. More specifically, the liquid block copolymer surprisingly reduces the viscosity of the surfactant composition which allows for simple formulations to be produced, less alcohol to be used, less chemical waste to be generated, and decreased production costs to be realized. More specifically, the liquid block copolymer allows less of the alcohol to be used which enables more efficient and effective material handling and final product batching. The inclusion of the liquid block copolymer in the surfactant composition also creates a less expensive and more efficient method of introducing the liquid block copolymer into a final detergent product without the need of a dedicated ingredient tank, which reduces production costs and complexities. Moreover, the liquid block copolymer allows the surfactant composition to maintain a consistent low viscosity profile.

Without wishing to be bound by theory, it is believed that by incorporating the liquid block copolymer as a rheology modifying agent, the surfactant composition shows a trend of changing the behavior of the fluids from non-Newtonian, when the rheology modifier is not added, to approximately Newtonian, when the rheology modifier is added. In other words, the present inventions provides a surfactant composition with Newtonian or approximately Newtonian behavior upon inclusion of the rheology modifying agent.

BRIEF DESCRIPTION OF THE DRAWINGS

The present disclosure will hereinafter be described in conjunction with the following Figures, wherein:

FIG. 1 is a line graph of Viscosity of Formulae 1-6 of the Examples as a Function of Shear Rate illustrating the non-Newtonian behavior of various comparative compositions of the disclosure and the approximate Newtonian behavior of various surfactant compositions including the rheology modifying agent of this disclosure when subjected to varying shear rates, as also set forth in the Examples.

DETAILED DESCRIPTION OF THE INVENTION

The following detailed description is merely exemplary in nature and is not intended to limit the disclosure. Furthermore, there is no intention to be bound by any theory presented in the preceding background or the following detailed description.

Embodiments of the present disclosure are generally directed to detergent compositions and methods for forming the same. For the sake of brevity, conventional techniques related to surfactant compositions may not be described in detail herein. Moreover, the various tasks and process steps described herein may be incorporated into a more comprehensive procedure or process having additional steps or functionality not described in detail herein. In particular, various steps in the manufacture of surfactant compositions are well-known and so, in the interest of brevity, many conventional steps will only be mentioned briefly herein or will be omitted entirely without providing the well-known process details.

In one aspect, the present disclosure provides a surfactant composition with a consistent, low viscosity profile. The surfactant composition may comprise a particular surfactant, water, an alkyl alcohol, and a particular liquid block copolymer, as described in detail below. Of the components, the liquid block copolymer is a rheology modifying agent. The surfactant composition may be used downstream to form a detergent composition, e.g. a detergent composition that is used in a unit dose pack detergent product.

In another aspect, the present disclosure provides a method for modifying rheology of a surfactant composition. The method includes the steps of providing the surfactant component, providing the alkyl alcohol, and providing the liquid block copolymer. The method also includes the step of combining the surfactant component, the alkyl alcohol, and the liquid block copolymer to form the surfactant composition. Upon formation, the surfactant component is present in an amount of from about 20 to about 80 weight percent actives based on a total weight of the surfactant composition, the alkyl alcohol is present in an amount of from about 3 to about 10 weight percent based on a total weight of the surfactant composition, and the liquid block copolymer is present in an amount of about 5 to about 30 weight percent actives based on a total weight of the surfactant composition. Moreover, upon combination, the surfactant composition includes water present in a total amount of about 10 to about 50 weight percent based on a total weight of the surfactant composition. In the method, the surfactant composition has a modified and consistent low viscosity of less than about 5,000 cps measured at 20° C. For example, this viscosity can be measured using an AR2000-EX Rheometer at a shear rate of 1.08 l/s over 5 minutes at 20° C. with a geometry cone of 40 mm, 1:59:49 degree:min:sec, and a truncation gap of 52 microns.

It was unexpectedly discovered that, as a result of incorporating the rheology modifying agent, i.e., the liquid block copolymer, the surfactant composition shows a trend of changing from a non-Newtonian fluid to a Newtonian, or approximately Newtonian, fluid. A Newtonian fluid is a fluid wherein the ratio between shear stress changes linearly in proportion to the stress to which it is exposed. This proportion is known as viscosity. A Newtonian fluid exhibits a consistent viscosity level. More specifically, Newtonian fluids also typically exhibit a commensurate, linear increase in shear stress with increases in shear rate, while non-Newtonian fluids exhibit a non-linear relationship between shear stress and shear rate. Various non-Newtonian fluids can exhibit shear thickening (i.e., an increase in viscosity with increased shear rates) or shear thinning (i.e., a decrease in viscosity with increased shear rate). Non-Newtonian fluids that exhibit shear thinning may have a yield point. The yield point is an oscillation stress at which steeper declines in viscosity are produced, as indicated by shear modulus (G') decline, with further increases in the oscillation stress beyond the yield point also producing the steeper decline in shear modulus. At oscillation stress below the yield point, changes in shear rate with stress have a minimal to no impact on the viscosity of the material. At oscillation stress above the yield point, the material begins to exhibit rapid viscosity decreases with increased levels of stress.

It was also unexpectedly discovered that incorporation of the rheology modifying agent in the surfactant composition, along with the alkyl alcohol, also lowers the viscosity of the surfactant composition as compared to when the rheology modifying agent and the alkyl alcohol is not added. The consistent, low viscosity profile is advantageous for downstream use in a detergent composition and/or unit dose detergent product.

Surfactant Composition

This disclosure provides the surfactant composition, first introduced above and hereinafter referred to as a composition. The composition may be, include, consist essentially of, or consist of, a surfactant component including an alcohol ethoxy sulfate, an alkyl alcohol, water, and a liquid block copolymer, as each is described below, e.g. in any one or more of the amounts described in greater detail below.

In one embodiment, the composition comprises the surfactant component including an alcohol ethoxy sulfate, an alkyl alcohol, water, and the liquid block copolymer.

In another embodiment, the composition consists essentially of the surfactant component including an alcohol ethoxy sulfate, an alkyl alcohol, water, and the liquid block copolymer.

In still another embodiment, the composition consists of the surfactant component including an alcohol ethoxy sulfate, an alkyl alcohol, water, and the liquid block copolymer.

In one embodiment, the composition comprises the surfactant component including an alcohol ethoxy sulfate and present in an amount of from about 20 to about 80 weight percent actives based on a total weight of the composition; water present in a total amount of from about 10 to about 50 weight percent based on a total weight of the composition; an alkyl alcohol present in an amount of from about 3 to about 10 weight percent based on a total weight of the composition, and a liquid block copolymer present in an amount of about 5 to about 30 weight percent actives based on a total weight of the composition, each as described in greater detail below.

In another embodiment, the composition consists essentially of the surfactant component including an alcohol ethoxy sulfate and present in an amount of from about 20 to about 80 weight percent actives based on a total weight of the composition; water present in a total amount of from about 10 to about 50 weight percent based on a total weight of the composition; an alkyl alcohol present in an amount of from about 3 to about 10 weight percent based on a total weight of the composition, and a liquid block copolymer present in an amount of about 5 to about 30 weight percent actives based on a total weight of the composition, each as described in greater detail below.

In still other embodiments, the composition may comprise, consist essentially of, or consist of, any combination of components described herein, in any amounts described herein.

In further embodiments, the composition is free of, or includes less than 1, 0.5, 0.1, 0.05, or 0.01, weight percent of, any one or more of the optional components or additives described below and/or those such as, but not limited to, cationic surfactants, amphoteric(zwitterionic surfactants), etc.

The composition of this disclosure is typically described as a surfactant composition because it includes more highly concentrated components than a typical "detergent" composition. For example, the surfactant composition can be described as a type of surfactant masterbatch or component that is then used to form a detergent or detergent composition in a downstream production process. The surfactant composition of this disclosure may be further diluted and/or combined with other components to form an eventual detergent composition, as would generally be defined in the art.

Surfactant Component

As first introduced above, the composition includes the surfactant component. The surfactant component can include a single surfactant or two or more surfactants. The surfactant component includes an alcohol ethoxy sulfate, which may be described as an anionic surfactant. The alcohol ethoxy sulfate has a $C_8$-$C_{20}$ backbone that is ethoxylated with from about 1 to about 10 moles of ethylene oxide. Alternatively, the alcohol ethoxy sulfate may be described as having a $C_8$-$C_{20}$ backbone and about 1 to 10 moles of ethylene oxide units bonded thereto. The metal may be any metal but is typically sodium or potassium. The backbone of the surfactant component may have any number of carbon atoms from 8 to 20, e.g. 10 to 18, 12 to 16, 12 to 14, 14 to 16, or 8, 9, 10, 11, 12, 13, 14, 15, 16, 17, 18, 19, or 20, carbon atoms. Various mixtures of alcohol ethoxy sulfates may also be used wherein different length backbones are utilized. The backbone is ethoxylated with from about 1 to about 10, about 2 to about 9, about 3 to about 8, about 4 to about 7, about 5 to about 6, or 1, 2, 3, 4, 5, 6, 7, 8, 9, or 10, moles of ethylene oxide. In various non-limiting embodiments, all values, both whole and fractional, between and including all of the above, are hereby expressly contemplated for use herein.

In various embodiments, the alcohol ethoxy sulfate is further defined as sodium laureth sulfate (SLES) having the formula: $CH_3(CH_2)_{10}CH_2(OCH_2CH_2)_nOSO_3Na$ wherein n is from about 1 to about 10. In another embodiment, the alcohol ethoxy sulfate is sodium laureth sulfate ethoxylated with about 2 to about 4 moles of ethylene oxide. In various non-limiting embodiments, all values, both whole and fractional, between and including all of the above, are hereby expressly contemplated for use herein.

The surfactant component is present in an amount of from about 20 to about 80, about 25 to about 75, about 30 to about 70, about 35 to about 65, about 40 to about 60, about 45 to about 55, about 45 to about 50, about 40 to about 45, or about 35 to about 45, weight percent actives based on a total weight of the composition. In other embodiments, the surfactant component is present in an amount of about 40, 41, 42, 43, 44, or 45, weight percent actives based on a total weight of the composition. In various non-limiting embodiments, all values, both whole and fractional, between and including all of the above, are hereby expressly contemplated for use herein.

The entire weight of the surfactant component may be the weight of the alcohol ethoxy sulfate itself without any additional surfactants included in this weight. Alternatively, other surfactants may be included in this weight percentage. In various non-limiting embodiments, all values, both whole and fractional, between and including all of the above, are hereby expressly contemplated for use herein.

Water:

Water is present in the composition in an amount of from about 10 to about 50 weight percent based on a total weight of the composition. In various embodiments, water is present in a total amount of from about 15 to about 45, about 20 to about 40, about 25 to about 35, about 25 to about 30, about 20 to about 50, about 25 to about 45, about 30 to about 40, or about 35 to about 40, weight percent based on a total weight of the composition. Typically, the terminology "total amount" refers to a total amount of water present in the composition from all components, i.e., not simply water added independently from, for example, the surfactant component and/or the liquid block copolymer. In various non-limiting embodiments, all values, both whole and fractional, between and including all of the above, are hereby expressly contemplated for use herein.

An independent source of water, such as DI water, may be used to dilute the composition. This water may be independent from any water present in the composition as originating from one or more components. In other words, the composition includes water originating from the components themselves. However, to further dilute the composition, the independent water source may be used. Alternatively, an independent source of water may be excluded.

Alkyl Alcohol:

The composition also includes an alkyl alcohol. The alkyl alcohol may be any alcohol that includes an alkyl group. For example, the alkyl group may include 1, 2, 3, 4, 5, 6, 7, 8, 9, 10, 11, 12, 13, 14, 15, 16, 17, 18, 19, 20, or more, carbon atoms. For example, the alkyl group may be methyl, ethyl, propyl, butyl, etc., such that the alcohol is methanol, ethanol, propanol, butanol, etc. Alternatively, the alkyl alcohol may include two or more such alcohols. In varying embodiments, the alkyl alcohol includes blends of higher carbon chain length alkyl alcohols such as C8-C12, C10-C14, C16-C18, alcohol, etc. Typically, the alkyl alcohol is ethanol. In various non-limiting embodiments, all values, both whole and fractional, between and including all of the above, are hereby expressly contemplated for use herein.

The alkyl alcohol is present in an amount of from about 3 to about 10 weight percent based on a total weight of the composition. In varying embodiments, the alkyl alcohol is present in an amount of about 4 to about 9, about 5 to about 8, about 6 to about 7, or 3, 4, 5, 6, 7, 8, 9, or 10, weight percent based on a total weight of the composition. In various non-limiting embodiments, all values, both whole and fractional, between and including all of the above, are hereby expressly contemplated for use herein.

Liquid Block Copolymer:

The composition also includes a liquid block copolymer. This block copolymer is liquid to minimize any stability and crystallization issues that may arise if a solid compound was used. For example, the liquid block copolymer may contribute to the excellent flowability and usability of the composition in various cleaning environments. The liquid block copolymer is typically utilized as a rheology modifying agent.

The liquid block copolymer is present in an amount of from about 5 to about 30 weight percent actives based on a total weight of the composition. In various embodiments, the liquid block copolymer is present in an amount of from about 10 to about 25, about 15 to about 20, weight percent actives based on a total weight of the composition. In other embodiments, the liquid block copolymer is present in an amount of from about 12 to 18 or about 12, 13, 14, 15, 16, 17, or 18, weight percent actives based on a total weight of the composition. In various non-limiting embodiments, all values, both whole and fractional, between and including all of the above, are hereby expressly contemplated for use herein.

The liquid block copolymer may be a single copolymer or may be a combination of copolymers. Alternatively, liquid block copolymer may be a single poloxamer or may be a combination of poloxamers. The single copolymer or the combination may have one or more of the following formulae:

 (I); and/or

 (II).

In other words, the liquid block copolymer may be or include one or more individual copolymers each independently having formula (I) or (II). Alternatively, the liquid block copolymer may be or include copolymers of just one of the aforementioned formulae, e.g. just (I) or just (II), to the exclusion of the other.

The liquid block copolymer of formula (I) may be alternatively described as a poloxamer. The liquid block copolymer of formula (II) may be alternatively described as a reverse poloxamer. As is appreciated in the art, poloxamers are typically nonionic triblock copolymers composed of a central hydrophobic chain of polypropylene oxide flanked by two hydrophilic chains of polyethylene oxide, e.g. as set forth in formula (I). The terminology "reverse" poloxamer describes a compound wherein the central hydrophobic chain of polypropylene oxide is substituted for a hydrophilic chain of polyethylene oxide and the flanking hydrophilic chains of polyethylene oxide are substituted for a flanking hydrophobic chains of polypropylene oxide, e.g. as set forth in formula (II).

In the aforementioned formulae (I) and (II), EO is a —$CH_2CH_2O$— group (ethyleneoxy group) and PO is a —$CH(CH_3)CH_2O$— group (propyleneoxy group). Moreover, each of $R^1$ and $R^2$ is independently H or a $C_1$-$C_{22}$ alkyl group. In one embodiment, both of $R^1$ and $R^2$ are H atoms. In another embodiment, one of $R^1$ and $R^2$ is an H atom and the other is the $C_1$-$C_{22}$ alkyl group. In a further embodiment, both of $R^1$ and $R^2$ are each independently the $C_1$-$C_{22}$ alkyl group.

Each $C_1$-$C_{22}$ alkyl group may independently be any alkyl group including linear, branched, and/or cyclic alkyl groups. Each $C_1$-$C_{22}$ alkyl group may independently have from 1 to 22, 2 to 20, 4 to 18, 6 to 16, 8 to 14, or 10 to 12, carbon atoms. Alternatively, each $C_1$-$C_{22}$ alkyl group may independently have 1, 2, 3, 4, 5, 6, 7, 8, 9, 10, 11, 12, 13, 14, 15, 16, 17, 18, 19, 20, 21, or 22, carbon atoms. In various non-limiting embodiments, all values, both whole and fractional, between and including all of the above, are hereby expressly contemplated for use herein.

Relative to formulae (I) and (II), each of a, b, and c is independently about 1 to about 70 provided that the weight average molecular weight of the liquid block copolymer is less than about 5,000 g/mol. For example, each of a, b, and c may be about 5 to about 65, about 10 to about 60, about 15 to about 55, about 20 to about 50, about 25 to about 45, about 30 to about 40, or about 35 to about 40. In various non-limiting embodiments, all values, both whole and fractional, between and including all of the above, are hereby expressly contemplated for use herein.

In other embodiments relative to formulae (I) and (II), each of a, b, and c may be 1, 2, 3, 4, 5, 6, 7, 8, 9, 10, 11, 12, 13, 14, 15, 16, 17, 18, 19, 20, etc. up to 70. In still other embodiments relative to formula (I) and (II), each of a+b+c is from about 3 to about 70, about 5 to about 65, about 10 to about 60, about 15 to about 55, about 20 to about 50, about 25 to about 45, about 30 to about 40, about 35 to about 40, about 10 to about 20, about 10 to about 15, about 15 to about 20, or about 10, 11, 12, 13, 14, 15, 16, 17, 18, 19, or 20. In various non-limiting embodiments, all values, both whole and fractional, between and including all of the above, are hereby expressly contemplated for use herein.

In still other embodiments relative to formulae (I) and (II), the ratio of a:b:c is about 2.5:5:2.5, or about 5:2.5:5. In still other embodiments, the ratio of a:b:c is about 1:50:1 to about 50:1:1, e.g. about 1:10:1 to about 10:1:10. Further, the ratio of a:b:c may be about 1:2:1 to about 1:9:1. In one embodiment, the liquid block copolymer has formula (II) wherein a ratio of a:b:c is about 1:2:1 and has a weight average molecular weight of about 1000 g/mol. In various non-limiting embodiments, all values, both whole and fractional, between and including all of the above, are hereby expressly contemplated for use herein.

In still other embodiments relative to formulae (I) and (II), the weight of a:b:c may be about 5%:90%:5% to 90%:5%: 90%. In various non-limiting embodiments, all values, both whole and fractional, between and including all of the above, are hereby expressly contemplated for use herein.

The aforementioned values of each of a, b, and c are chosen such that the weight average molecular weight of said liquid block copolymer is less than about 5,000 g/mol. In various embodiments, the terminology "about" refers to a ± of 10, 50, 100, or 500 g/mol. In other embodiments, the terminology "about" refers to a ± of 0.1, 0.5, 1, 2, 3, 4, 5, 6, 7, 8, 9, or 10, %.

In various embodiments, the weight average molecular weight of the liquid block copolymer is from about 100 to about 1000, about 200 to about 900, about 300 to about 800, about 400 to about 700, about 500 to about 600, about 200 to about 700, about 300 to about 800, about 100 to about 5,000, about 200 to about 2,900, about 300 to about 2,800, about 400 to about 2,700, about 500 to about 2,600, about 600 to about 2,500, about 700 to about 2,400, about 800 to about 2,300, about 900 to about 2,200, about 1,000 to about 2,100, about 1,100 to about 2,000, about 1,200 to about 1,900, about 1,300 to about 1,800, about 1,400 to about 1,700, about 1,500 to about 1,600, about 500 to about 1,000, about 500 to about 1,500, about 500 to about 2,000, about 500 to about 2,500, about 1,000 to about 1,500, about 750 to about 1,250, about 1,500 to about 3,000, about 2,000 to about 3,000, about 3,000 to about 5,000, about 3,500 to about 4,500, about 4,000 to about 4,500, about 1,000 to about 5,000, about 1,500 to about 5,000, about 2,000 to about 5,000, about 2,500 to about 5,000, etc., g/mol. In various non-limiting embodiments, all values, both whole and fractional, between and including all of the above, are hereby expressly contemplated for use herein.

In one embodiment, the liquid block copolymer has formula (II) and a ratio of a:b:c is about 2:4.5:2 to about 3:5.5:3. In another embodiment, the liquid block copolymer has formula (II), a ratio of a:b:c is about 2.5:5:2.5, a+b+c is about 20 to about 30, each of $R^1$ and $R^2$ is H, and the weight average molecular weight is about 1,000 g/mol. In various non-limiting embodiments, all values, both whole and fractional, between and including all of the above, are hereby expressly contemplated for use herein.

In a further embodiment, the alcohol ethoxy sulfate is sodium laureth sulfate ethoxylated with about 2 to about 4 moles of ethylene oxide, the liquid block copolymer has formula (II), has a ratio of a:b:c of about 2.5:5:2.5, a+b+c is about 20 to about 30, each of $R^1$ and $R^2$ is H, and the weight average molecular weight is about 1,000 g/mol. In various non-limiting embodiments, all values, both whole and fractional, between and including all of the above, are hereby expressly contemplated for use herein.

Weight Percents/Ratios of Various Components:

The surfactant component, alkyl alcohol, water, and liquid block copolymer are generally present in amounts within the weight ranges set forth above. However, in additional embodiments, these weight ranges may be narrower and/or specific weight ratios may be utilized. These weight ranges and/or ratios may be representative of embodiments that produce special, superior, and unexpected results, such as those demonstrated in the Examples. Relative to all of the paragraphs set forth immediately below, in various non-limiting embodiments, all values, both whole and fractional, between and including all of the above, are hereby expressly contemplated for use herein.

In various embodiments, the surfactant component is present in an amount of about 40, 41, 42, 43, 44, or 45, weight percent actives based on a total weight of the composition, and the alkyl alcohol (such as ethanol) is present in an amount of 5, 6, 7, 8, 9, 10, 11, or 12, weight percent based on a total weight of the composition. In further embodiments, the liquid block copolymer is present in an amount of from about 12 to about 18, e.g. 12, 13, 14, 15, 16, 17, or 18, weight percent actives based on a total weight of the composition. In such embodiments, water may be present in an amount of from about 10 to about 35 weight percent based on a total weight of the composition.

In other embodiments, a weight ratio of the actives of the surfactant component:alkyl alcohol:actives of the liquid block copolymer is about 42:(3 to 9):(5 to 30). In other embodiments, a weight ratio of the actives of the surfactant component:alkyl alcohol:actives of the liquid block copolymer is about (40 to 45):(3 to 9):(5 to 30). In one embodiment, the ratio is about 42:6:12. In another embodiment, the ratio is about 42:6:18.

In other embodiments, the surfactant component, such as sodium laureth sulfate ethoxylated with about 2 to about 4 moles of ethylene oxide, is a 70% actives, 30% water solution, the alkyl alcohol is ethanol, and the liquid block copolymer has formula (II) wherein a ratio of a:b:c is about 1:2:1 and has a weight average molecular weight of about 1000 g/mol. In related embodiments, a weight ratio of the surfactant component (including water and actives):ethanol: actives of the liquid block copolymer is about 60:6:12 or about 60:6:18. In similar embodiments, the surfactant component has a viscosity of less than about 1,200 cps (e.g. less than or equal to about 1124 cps) or less than about 750 (e.g. less than about 754 cps) measured at 20° C. Again, for example, this viscosity can be measured using an AR2000-EX Rheometer at a shear rate of 1.08 l/s over 5 minutes at 20° C. with a geometry cone of 40 mm, 1:59:49 degree: min:sec, and a truncation gap of 52 microns.

In another embodiment, a weight ratio of the actives of the surfactant component:alkyl alcohol:actives of the liquid block copolymer is about 42:(3 to 9):(5 to 30), wherein the surfactant is sodium laureth sulfate, wherein the alkyl alcohol is ethanol, wherein the liquid block copolymer has formula (II) wherein a ratio of a:b:c is about 1:2:1 and has a weight average molecular weight of about 1000 g/mol, and wherein the viscosity is less than about 1,500 or 1,200 cps.

In a further embodiment, a weight ratio of the actives of the surfactant component:alkyl alcohol:actives of the liquid block copolymer is about 42:6:12, wherein the surfactant is sodium laureth sulfate, wherein the alkyl alcohol is ethanol, wherein the liquid block copolymer has formula (II) wherein a ratio of a:b:c is about 1:2:1 and has a weight average molecular weight of about 1000 g/mol, and wherein the viscosity is less than about 750 cps.

In another embodiment, a weight ratio of the actives of the surfactant component:alkyl alcohol:actives of the liquid block copolymer is about 42:6:18, wherein the surfactant is sodium laureth sulfate, wherein the alkyl alcohol is ethanol, wherein the liquid block copolymer has formula (II) wherein a ratio of a:b:c is about 1:2:1 and has a weight average molecular weight of about 1000 g/mol, and wherein the viscosity is less than about 1,500 or 1,200 cps.

In still another embodiment, the liquid block copolymer has formula (II) wherein a ratio of a:b:c is about 1:2:1 and has a weight average molecular weight of about 1000 g/mol and is present in an amount of about 12 weight percent actives based on a total weight of the surfactant composition.

In a further embodiment, the liquid block copolymer has formula (II) wherein a ratio of a:b:c is about 1:2:1 and has a weight average molecular weight of about 1000 g/mol and is present in an amount of about 18 weight percent actives based on a total weight of the surfactant composition.

In another embodiment, the alcohol ethoxy sulfate is sodium laureth sulfate ethoxylated with about 2 to about 4 moles of ethylene oxide and is present in an amount of about 40 to about 45 weight percent actives based on a total weight of the surfactant composition.

In a further embodiment, the alkyl alcohol is present in an amount of from about 3 to about 6 weight percent based on a total weight of the surfactant composition.

In an additional embodiment, the alkyl alcohol is ethanol and is present in an amount of from about 3 to about 6 weight percent based on a total weight of the surfactant composition In another embodiment, the alkyl alcohol is ethanol and wherein a weight ratio of the actives of the surfactant component:ethanol:actives of the liquid block copolymer is about 42:(3 to 9):(5 to 30).

In still another embodiment, the alkyl alcohol is ethanol and wherein the liquid block copolymer has formula (II) wherein a ratio of a:b:c is about 1:2:1 and has a weight average molecular weight of about 1000 g/mol.

In a further embodiment, the alcohol ethoxy sulfate is sodium laureth sulfate ethoxylated with about 2 to about 4 moles of ethylene oxide, wherein the alkyl alcohol is ethanol, and wherein the liquid block copolymer has formula (II) wherein a ratio of a:b:c is about 1:2:1 and has a weight average molecular weight of about 1000 g/mol.

In still other embodiments, the weight ratio of the alkyl alcohol:actives of the liquid block copolymer contributes to the superior and unexpected results associated with the instant disclosure. For example, the alkyl alcohol may be any described herein singularly or in combination with one another while the liquid block copolymer may be only of the formula (I) $R^1O\text{-}(EO)_a\text{—}(PO)_b\text{-}(EO)_c\text{—}R^2$, only of the formula (II) $R^1O\text{—}(PO)_a\text{-}(EO)_b\text{—}(PO)_c\text{—}R^2$, or a combination of actives of both formula (I) and formula (II). In various non-limiting embodiments, the weight ratio of the alkyl alcohol:actives of the liquid block copolymer is about (3 to 10):(5 to 30), e.g. (3 to 9):(5 to 30). For example, the first value may be about 3, 4, 5, 6, 7, 8, 9 or 10 or any fractional value therebetween. The second value may be about 5, 6, 7 . . . 28, 29, or 30, or any fractional value therebetween. In one embodiment, the weight ratio is about 6:(12 to 18). In another embodiment, the weight ratio is about 6:12. In a further embodiment, the weight ratio is about 6:18. These ratios may be considered and utilized independent of any amount of the actives of the surfactant component. Any and all weight ratios described in this specification may alternatively be utilized independently from the actives of the surfactant component.

In all of the aforementioned non-limiting embodiments, all values, both whole and fractional, between and including all of the above, are hereby expressly contemplated for use herein.

Physical Properties:

Typically, compositions that include alcohol ethoxy sulfates and water have viscosity issues. However, the composition of the instant disclosure has decreased viscosity as compared to what would otherwise be expected. For example, the composition of this disclosure has a viscosity of less than about 5,000, about 4,500, about 4,000, about 3,500, about 3,000, about 2,500, about 2,000, about 1,500, about 1,200, about 1,000, or about 750, cps measured at 20° C. Again, this viscosity can be measured using an AR2000-EX Rheometer at a shear rate of 1.08 l/s over 5 minutes at 20° C. with a geometry cone of 40 mm, 1:59:49 degree:min:sec, and a truncation gap of 52 microns. In various embodiments, the cone is part number 511406.901. However, the shear rate, time, temperature, geometry cone, values for degree:min:sec, and truncation gap may all vary and be chosen by one of skill in the art. For example, the shear rate may be measured as is set forth in the Examples and Figures. In various non-limiting embodiments, all values, both whole and fractional, between and including all of the above, are hereby expressly contemplated for use herein.

Although the viscosity of the composition is described above as being measured at 20° C., for example using an AR2000-EX Rheometer, the viscosity may be alternatively measured using other techniques. For example, the viscosity may be measured using a Brookfield viscometer and any one or more spindles, as is chosen by one of skill in the art. In various embodiments, the composition has one or more of the aforementioned viscosities measured using a DV2T Brookfield viscometer at 20 rpm and 70° F. using spindle LV02(62).

Typically, a surfactant component such as sodium laureth sulfate (e.g. 70% actives in 30% water) has a viscosity of about 32,000 cps measured at 20° C. This viscosity may be measured using an AR2000-EX Rheometer at a shear rate of 1.08 l/s over 5 minutes at 20° C. with a geometry cone of 40 mm, 1:59:49 degree:min:sec, and a truncation gap of 52 microns. This is too thick/viscous to be commercially useful. If such a surfactant component is diluted with ethanol in a weight ratio of about 60:12 of surfactant:ethanol, such a mixture typically has a viscosity of about 230 cps measured at 20° C. This viscosity may be measured using an AR2000-EX Rheometer at a shear rate of 1.08 l/s over 5 minutes at 20° C. with a geometry cone of 40 mm, 1:59:49 degree:min:sec, and a truncation gap of 52 microns. However, such a mixture requires additional shipping and handling protections due to the amount of ethanol included therein. Furthermore, if such a mixture is created with less ethanol, e.g. in a weight ratio of 60:6 of surfactant:ethanol, such a mixture typically has a viscosity of about 18,000 cps measured at 20° C. This viscosity may be measured using an AR2000-EX Rheometer at a shear rate of 1.08 l/s over 5 minutes at 20° C. with a geometry cone of 40 mm, 1:59:49 degree:min:sec, and a truncation gap of 52 microns. This is again too thick/viscous to be commercially useful. Moreover, if such a surfactant component is diluted with a liquid block copolymer without ethanol in a weight ratio of about 60:12 of surfactant:liquid block copolymer, such a mixture typically has a viscosity of about 20,000 cps measured at 20° C. This viscosity may be measured using an AR2000-EX Rheometer at a shear rate of 1.08 l/s over 5 minutes at 20° C. with a geometry cone of 40 mm, 1:59:49 degree:min:sec, and a truncation gap of 52 microns. This is also too thick/viscous to be commercially useful. Accordingly, the surfactant composition of this disclosure provides particularly special unexpected results associated with minimized viscosity when the surfactant component is combined with the alkyl alcohol (such as ethanol), water, and the liquid block copolymer of this disclosure. This combination provides special and unexpected rheology controlling results that are superior to what would otherwise be expected by those of skill in the art.

In various embodiments, the liquid block copolymer surprisingly reduces the viscosity of the surfactant composition which allows for simple formulations to be produced, less alcohol to be used, less chemical waste to be generated, and decreased production costs to be realized. More specifically, the liquid block copolymer allows less of the alcohol to be used which enables more efficient and effective material handling and final product batching. The inclusion of the liquid block copolymer in the surfactant composition also creates a less expensive and more efficient method of introducing the liquid block copolymer into a final detergent product without the need of a dedicated ingredient tank, which reduces production costs and complexities. Moreover, the liquid block copolymer allows the surfactant composition to maintain a consistent low viscosity profile.

Without wishing to be bound by theory, it is believed that by incorporating the liquid block copolymer as a rheology modifying agent, the surfactant composition shows a trend of changing the behavior of the fluids from non-Newtonian, when the rheology modifier is not added, to approximately Newtonian, when the rheology modifier is added. In other words, the present inventions provides a surfactant composition with Newtonian or approximately Newtonian behavior upon inclusion of the rheology modifying agent.

Additional Embodiments

This disclosure also provides a surfactant composition exhibiting approximate Newtonian behavior. The terminology "approximate Newtonian behavior" is as is understood by those of skill in the art, wherein Newtonian behavior is as described above. The surfactant composition includes the surfactant composition, alkyl alcohol, water, and the liquid block copolymer described above.

Method for Modifying Rheology of the Detergent Composition:

As first introduced above, this disclosure further provides a method for modifying rheology of the surfactant composition. The method includes the steps of providing the surfactant component, providing the alkyl alcohol, and providing the liquid block copolymer. The method also includes the step of combining the surfactant component, the alkyl alcohol, and the liquid block copolymer to form the surfactant composition. Upon formation, the surfactant component is present in an amount of from about 20 to about 80 weight percent actives based on a total weight of the surfactant composition, the alkyl alcohol is present in an amount of from about 3 to about 10 weight percent based on a total weight of the surfactant composition, and the liquid block copolymer is present in an amount of about 5 to about 30 weight percent actives based on a total weight of the surfactant composition. Moreover, upon combination, the surfactant composition includes water present in a total amount of about 10 to about 35 weight percent based on a total weight of the surfactant composition. In the method, the surfactant composition has a viscosity of less than about 5,000 cps measured at 20° C. This viscosity may be measured using an AR2000-EX Rheometer at a shear rate of 1.08 l/s over 5 minutes at 20° C. with a geometry cone of 40 mm, 1:59:49 degree:min:sec, and a truncation gap of 52 microns.

EXAMPLES

The following compositions are formulated and evaluated to determine viscosity.

Composition 1 (comparative) is sodium laureth sulfate (SLES) as a 70% by weight actives mixture in 30% by weight water supplied as Steol CS270 by Stepan. The weight ratio of SLES:ethanol:liquid block copolymer is 100:0:0 by total weight.

Composition 2 (comparative) is 60 g of the aforementioned SLES (70% actives) combined with 12 g ethanol. The weight ratio of SLES:ethanol:liquid block copolymer is 60:12:0 by total weight. The weight ratio by actives is 42:12:0.

Composition 3 (comparative) is 60 g of the aforementioned SLES (70% actives) combined with 12 g of the liquid block copolymer. The weight ratio of SLES:ethanol:liquid block copolymer is 60:0:12 by total weight. The weight ratio by actives is 42:0:12.

Composition 4 (inventive) is 60 g of the aforementioned SLES (70% actives) combined with 6 g ethanol and 12 g of the liquid block copolymer. The weight ratio of SLES:ethanol:liquid block copolymer is 60:6:12 by total weight. The weight ratio by actives is 42:6:12.

Composition 5 (comparative) is 60 g of the aforementioned SLES (70% actives) combined with 6 g ethanol. The weight ratio of SLES:ethanol:liquid block copolymer is 60:6:0 by total weight. The weight ratio by actives is 42:6:0.

Composition 6 (inventive) is 60 g of the aforementioned SLES (70% actives) combined with 6 g ethanol and 18 g of the liquid block copolymer. The weight ratio of SLES:ethanol:liquid block copolymer is 60:6:18 by total weight. The weight ratio by actives is 42:6:18.

The liquid block copolymer has formula (II) wherein a ratio of a:b:c is about 1:2:1 and has a weight average molecular weight of about 1000 g/mol.

More specifically, these Compositions are evaluated using an AR2000-EX Rheometer, with a test method of increasing the shear rate from 0.41 to 10 l/s over 5 minutes at 20° C. with a geometry cone of 40 mm, 1:59:49 (degree:min:sec), and a truncation gap of 52 microns (cone is part number 511406.901).

The measured viscosities are reported in Table 1 below and illustrated in FIG. 1 wherein Compositions 1, 2, 3, and 5 (Comps. 1, 2, 3, and 5) are comparative and Compositions 4 and 6 (Comps. 4 and 6) are inventive and represent non-limiting embodiments of this disclosure.

TABLE 1

| Shear Rate (1/s) | Comp. 1 | Comp. 2 | Comp. 3 | Comp. 4 | Comp. 5 | Comp. 6 |
|---|---|---|---|---|---|---|
| | Viscosity (Pa · S) | | | | | |
| 0.41 | 95.51 | 0.4293 | 47.42 | 1.664 | 55.07 | 3.202 |
| 0.75 | 49.48 | 0.2936 | 27.29 | 1.029 | 28.73 | 1.833 |
| 1.08 | 32.98 | 0.2315 | 20.05 | 0.7541 | 18.62 | 1.124 |
| 1.41 | 24.73 | 0.2212 | 16.71 | 0.5969 | 13.91 | 0.8374 |
| 1.73 | 19.84 | 0.1963 | 14.88 | 0.5158 | 11.31 | 0.629 |
| 2.06 | 16.66 | 0.1758 | 13.58 | 0.4598 | 9.707 | 0.5204 |
| 2.39 | 14.55 | 0.1758 | 12.55 | 0.4089 | 8.653 | 0.4598 |
| 2.72 | 12.92 | 0.1896 | 11.79 | 0.3772 | 7.903 | 0.401 |
| 3.06 | 11.77 | 0.2012 | 11.07 | 0.3506 | 7.339 | 0.3678 |
| 3.39 | 10.64 | 0.1954 | 10.48 | 0.3417 | 6.842 | 0.3607 |
| 3.71 | 9.708 | 0.1941 | 10.02 | 0.3251 | 6.469 | 0.3663 |
| 4.05 | 9.031 | 0.2076 | 9.626 | 0.3047 | 6.157 | 0.3115 |
| 4.37 | 8.616 | 0.2203 | 9.274 | 0.2865 | 5.86 | 0.3027 |
| 4.71 | 8.195 | 0.2458 | 8.968 | 0.2782 | 5.591 | 0.2902 |
| 5.03 | 7.684 | 0.2526 | 8.666 | 0.2729 | 5.284 | 0.2956 |
| 5.37 | 7.263 | 0.2496 | 8.385 | 0.2656 | 5.039 | 0.2699 |
| 5.70 | 6.97 | 0.2744 | 8.12 | 0.2652 | 4.883 | 0.2679 |
| 6.03 | 6.687 | 0.2959 | 7.873 | 0.2668 | 4.733 | 0.2941 |
| 6.36 | 6.276 | 0.2935 | 7.654 | 0.2657 | 4.603 | 0.4252 |
| 6.68 | 6.086 | 0.2904 | 7.456 | 0.2642 | 4.463 | 0.429 |
| 7.02 | 5.888 | 0.2798 | 7.265 | 0.2683 | 4.273 | 0.4296 |
| 7.35 | 5.652 | 0.2722 | 7.09 | 0.2679 | 4.125 | 0.418 |
| 7.68 | 5.586 | 0.3064 | 6.929 | 0.2684 | 4.008 | 0.4163 |
| 8.01 | 5.383 | 0.2869 | 6.782 | 0.2712 | 3.917 | 0.4036 |
| 8.34 | 5.295 | 0.2826 | 6.618 | 0.2674 | 3.788 | 0.3978 |
| 8.67 | 5.093 | 0.2664 | 6.485 | 0.2681 | 3.698 | 0.387 |
| 8.99 | 4.923 | 0.2813 | 6.354 | 0.2606 | 3.611 | 0.3744 |
| 9.32 | 4.756 | 0.2756 | 6.203 | 0.2604 | 3.534 | 0.3505 |
| 9.66 | 4.613 | 0.2668 | 6.162 | 0.2554 | 3.456 | 0.3277 |
| 9.99 | 4.483 | 0.2953 | 6.072 | 0.2562 | 3.346 | 0.3134 |

As shown in the data above, the addition of ethanol significantly reduces the rheology of SLES when the ratio is 60 parts SLES Blend A to 12 parts ethanol. This is represented by Composition 2. However, inclusion of this amount of ethanol requires that additional shipping and handling precautions be taken which increases commercial costs. Therefore, this composition is not commercially efficient.

When the ratio is 60 parts SLES Blend A to 6 parts Ethanol represented by Composition 5, the viscosity at a shear rate of 1.08 l/s is reduced from about 32,980 cP (Composition 1) to about 18,620 cP (Composition 5). This viscosity is still too high to be commercially useable and efficient.

When an additional 12 parts of the liquid block copolymer is utilized, represented by Composition 4, the viscosity drops from about 18,620 cP (Composition 5) to about 754 cP (Composition 4). As a benchmark, a currently available commercial product has a viscosity of about 2,400 cP measured using an AR2000-EX Rheometer at a shear rate of 1.08 l/s over 5 minutes at 20° C. with a geometry cone of 40 mm, 1:59:49 degree:min:sec, and a truncation gap of 52 microns. Accordingly, Composition 4 represents an excellent performing product.

When 18 total parts of the liquid block copolymer is utilized, represented by Composition 6, the viscosity drops from about 18,620 cP (Composition 5) to about 1124 cP (Composition 6). Again, as compared to the aforementioned commercial benchmark, Composition 6 also represents an excellent performing product.

Therefore, the data associated with Compositions 3 and 5, shows that a blend of 60 parts (70% actives) SLES and 12 parts of the liquid block copolymer (Composition 3), without ethanol, and 60 parts (70% actives) SLES and 6 parts ethanol (Composition 5), without the liquid block copolymer, are each not as effective at reducing viscosity as a blend of 60 parts (70% actives) SLES and 12 parts liquid block copolymer and 6 parts ethanol (Composition 4) or as a blend of 60 parts (70% actives) SLES and 18 parts liquid block copolymer and 6 parts ethanol (Composition 6).

The data set forth above also demonstrates that comparative Compositions 1, 3, and 5 behave as non-Newtonian fluids, as evidenced by the viscosity measurements set forth in Table 1. Even with the addition of 6 g of ethanol, Composition 5 still acts as a non-Newtonian fluid. Only addition of 12 g of ethanol allows Formula 2 to behave in an approximately non-Newtonian fashion. Accordingly, one of skill in the art would not expect that using half the amount of ethanol, i.e., 6 g of ethanol, such as in Compositions 4 and 6, would allow these compositions to behave in an approximately non-Newtonian fashion. Again, this is evidenced by the viscosity measurements set forth in Table 1.

In sum, one of skill in the art would expect that the combination of the ethanol and the liquid block copolymer would not significantly reduce the viscosity of the compositions. This is especially true in view of the comparison of comparative Compositions 2 and 5 with inventive Compositions 4 and 6. Comparative Compositions 2 and 5 demonstrate that it requires about 12 g of ethanol to reduce the viscosity to useable levels. However, inventive Compositions 4 and 6 show that through use of the liquid copolymer, the viscosities of the Compositions are surprisingly reduced using only 6 g of ethanol. This is wholly unexpected. Moreover, and as explained above, it is also unexpected that use of the liquid block copolymer would allow the Compositions to behave in an approximately Newtonian manner thereby allowing for easier preparation, handling, and shipping of not only these Compositions but also of downstream compositions, such as detergent compositions.

This data also shows that it was found that the addition of reverse poloxamers (1000 mw, PO/EO/PO; 50% EO and 50% PO) into sodium laureth sulfate can reduce viscosity, enabling much easier handling. It was also found that blends of the reverse poloxamer and ethanol in sodium laureth sulfate can reduce the viscosity down to about 750 cP when measured using an AR2000-EX Rheometer at a shear rate of 1.08 l/s over 5 minutes at 20° C. with a geometry cone of 40 mm, 1:59:49 degree:min:sec, and a truncation gap of 52 microns. This combination utilizes about half of the ethanol as comparative composition. For these reasons, the reverse poloxamer utilized herein can reduce the amount of ethanol needed to handle sodium laureth sulfate at commercial facilities thereby enabling safer material handling and final product batching. Also, the reverse poloxamer can be introduced into downstream products without the need of a dedicated ingredient tank because it can be introduced with the sodium laureth sulfate. Without intending to be bound by any theory, it is also believed that this liquid block copolymer may be particularly suitable for enhancing pac haptics and reducing water migration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A surfactant composition exhibiting approximate Newtonian behavior under shear and comprising:
    A. ethoxylated sodium laureth sulfate that is ethoxylated with from about 2 to about 4 moles of ethylene oxide and is present in an amount of from about 20 to about 80 weight percent actives based on a total weight of said surfactant composition;
    B. water present in a total amount of about 10 to about 50 weight percent based on a total weight of said surfactant composition;
    C. ethanol present in an amount of from about 3 to about 10 weight percent based on a total weight of said surfactant composition; and
    D. a liquid block copolymer present in an amount of about 5 to about 30 weight percent actives based on a total weight of said surfactant composition and having the following formulae:

$$R^1O—(PO)_a-(EO)_b—(PO)_c—R^2 \qquad (II)$$

wherein EO is a —CH$_2$CH$_2$O— group and PO is a —CH(CH$_3$)CH$_2$O— group;
    wherein each of R$^1$ and R$^2$ is independently H;
    wherein a is about 1, b is about 2, and c is about 1 and a weight average molecular weight of said liquid block copolymer is about 1,000 g/mol, and
    wherein said surfactant composition has a viscosity of less than about 5,000 cps measured at 20° C.

2. The surfactant composition of claim 1 wherein a weight ratio of said actives of said ethoxylated sodium laureth sulfate:ethanol: actives of said liquid block copolymer is about 42:(6):(12 to 18).

3. The surfactant composition of claim 1 wherein a weight ratio of said actives of said ethoxylated sodium laureth sulfate:ethanol: actives of said liquid block copolymer is about 42:(3 to 9):(5 to 30), and wherein said viscosity is less than about 1,500 cps.

4. The surfactant composition of claim 1 wherein a weight ratio of said actives of said ethoxylated sodium laureth sulfate:ethanol: actives of said liquid block copolymer is about 42:6:12, and wherein said viscosity is less than about 750 cps.

5. The surfactant composition of claim 1 wherein a weight ratio of said actives of said ethoxylated sodium laureth sulfate:ethanol: actives of said liquid block copolymer is about 42:6:18, and wherein said viscosity is less than about 1,200 cps.

6. The surfactant composition of claim 1 wherein said liquid block copolymer is present in an amount of from about 12 to about 18 weight percent actives based on a total weight of said surfactant composition.

7. The surfactant composition of claim 1 wherein said liquid block copolymer is present in an amount of about 12 weight percent actives based on a total weight of said surfactant composition.

8. The surfactant composition of claim 1 wherein said liquid block copolymer is present in an amount of about 18 weight percent actives based on a total weight of said surfactant composition.

9. The surfactant composition of claim 1 wherein said ethoxylated sodium laureth sulfate is present in an amount of about 40 to about 45 weight percent actives based on a total weight of said surfactant composition.

10. The surfactant composition of claim 1 wherein said ethanol is present in an amount of from about 3 to about 6 weight percent based on a total weight of said surfactant composition.

11. The surfactant composition of claim 1 wherein a weight ratio of said ethanol:actives of said liquid block copolymer is about (3 to 9):(5 to 30).

12. The surfactant composition of claim 1 wherein a weight ratio of said ethanol:actives of said liquid block copolymer is about 6:(12 to 18).

13. The surfactant composition of claim 1 wherein a weight ratio of said actives of said ethoxylated sodium laureth sulfate:ethanol:actives of said liquid block copolymer is about 42:(3 to 9):(5 to 30).

14. A surfactant composition exhibiting approximate Newtonian behavior under shear and comprising:
A. ethoxylated sodium laureth sulfate that is ethoxylated with from about 2 to about 4 moles of ethylene oxide;
B. water present in a total amount of about 10 to about 35 weight percent based on a total weight of said surfactant composition;
C. ethanol; and
D. a liquid block copolymer having the following formulae:

wherein EO is a —CH$_2$CH$_2$O— group and PO is a —CH(CH$_3$)CH$_2$O— group;
wherein each of R$^1$ and R$^2$ is independently H;
wherein a is about 1, b is about 2, and c is about 1 and the weight average molecular weight of said liquid block copolymer is about 51,000 g/mol,
wherein said surfactant composition has a viscosity of less than about 1,500 cps measured at 20° C.; and
wherein a weight ratio of actives of the ethoxylated sodium laureth sulfate:ethanol the liquid block copolymer is about (7:1:2) to about (7:1:3).

15. A method for making a surfactant composition that exhibits approximate Newtonian behavior under shear, said method comprising the steps of:
providing a ethoxylated sodium laureth sulfate that is ethoxylated with from about 2 to about 4 moles of ethylene oxide;
providing ethanol;
providing a liquid block copolymer having the following formulae:

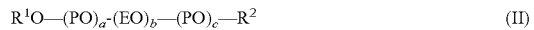

wherein EO is a —CH$_2$CH$_2$O— group and PO is a —CH(CH$_3$)CH$_2$O— group;
wherein each of R$^1$ and R$^2$ is independently H;
wherein a is about 1, b is about 2, and c is about 1 and the weight average molecular weight of the liquid block copolymer is less than about 1,000 g/mol, and
mixing the ethoxylated sodium laureth sulfate, the ethanol, the liquid block copolymer, and water to form the surfactant composition,
wherein the ethoxylated sodium laureth sulfate is present in an amount of from about 20 to about 80 weight percent actives based on a total weight of the surfactant composition, wherein the ethanol is present in an amount of from about 3 to about 10 weight percent based on a total weight of the surfactant composition, wherein the liquid block copolymer is present in an amount of about 5 to about 30 weight percent actives based on a total weight of the surfactant composition, wherein the surfactant composition comprises water present in a total amount of about 10 to about 35 weight percent based on a total weight of the surfactant composition and
wherein the surfactant composition has a viscosity of less than about 5,000 cps measured at 20° C.

16. The method of claim 15 wherein a weight ratio of the actives of the ethoxylated sodium laureth sulfate:ethanol: actives of said liquid block copolymer is about 42:(6):(12 to 18).

17. The method of claim 15 wherein a weight ratio of the actives of the ethoxylated sodium laureth sulfate:ethanol: actives of the liquid block copolymer is about 42:(3 to 9):(5 to 30), and wherein the viscosity is less than about 1,500 cps.

18. The method of claim 15 wherein a weight ratio of the actives of the ethoxylated sodium laureth sulfate:ethanol: actives of the liquid block copolymer is about 42:6:12, and wherein the viscosity is less than about 750 cps.

19. The method of claim 15 wherein a weight ratio of the actives of the ethoxylated sodium laureth sulfate:ethanol: actives of the liquid block copolymer is about 42:6:18, and wherein the viscosity is less than about 1,200 cps.

* * * * *

UNITED STATES PATENT AND TRADEMARK OFFICE
CERTIFICATE OF CORRECTION

PATENT NO. : 11,773,261 B2
APPLICATION NO. : 16/546557
DATED : October 3, 2023
INVENTOR(S) : Daniel T. Piorkowski It is certified that error appears in the above-identified patent and that said Letters Patent is hereby corrected as shown below:

In the Claims

Column 17, Line 30 Claim 14 change "51,000 g/mol" to --1,000 g/mol--.

Signed and Sealed this
Thirteenth Day of February, 2024

Katherine Kelly Vidal
Director of the United States Patent and Trademark Office